US012162181B2

(12) United States Patent
Miller et al.

(10) Patent No.: US 12,162,181 B2
(45) Date of Patent: Dec. 10, 2024

(54) METHOD AND SYSTEM FOR THE PRODUCTION OF MANUFACTURED WOOD

(71) Applicant: Deadwood Innovations Limited, Prince George (CA)

(72) Inventors: Jerry Miller, Prince George (CA); Owen Miller, Prince George (CA)

(73) Assignee: Deadwood Innovations Limited, Prince George (CA)

( * ) Notice: Subject to any disclaimer, the term of this patent is extended or adjusted under 35 U.S.C. 154(b) by 923 days.

(21) Appl. No.: 16/995,475

(22) Filed: Aug. 17, 2020

(65) Prior Publication Data

US 2021/0053248 A1 Feb. 25, 2021

(30) Foreign Application Priority Data

Aug. 23, 2019 (CA) ................................ CA 3053343

(51) Int. Cl.

*B27N 1/00* (2006.01)
*B27N 3/04* (2006.01)
*B27N 3/18* (2006.01)

(52) U.S. Cl.

CPC ................. *B27N 1/00* (2013.01); *B27N 3/04* (2013.01); *B27N 3/18* (2013.01); *B27K 2200/30* (2013.01)

(58) Field of Classification Search

CPC ... B27N 1/00; B27N 3/00; B27N 3/04; B27N 3/18; B27M 1/02; B27K 2200/30; B27L 11/005; B27L 11/00; B27L 11/08
USPC .......................................................... 144/329
See application file for complete search history.

(56) References Cited

U.S. PATENT DOCUMENTS

| | | | | | |
|---|---|---|---|---|---|
| 4,137,956 | A * | 2/1979 | Toberg | B27M 1/006 | 144/237 |
| 4,290,248 | A * | 9/1981 | Kemerer | B29C 48/05 | 264/210.1 |
| 4,695,345 | A | 9/1987 | Grace | | |
| 4,704,316 | A | 11/1987 | Grace | | |
| 4,711,684 | A * | 12/1987 | Coleman | B27M 1/02 | 156/196 |
| 4,711,689 | A | 12/1987 | Coleman | | |
| 5,179,986 | A * | 1/1993 | Beuving | B27N 5/00 | 144/24.1 |

(Continued)

FOREIGN PATENT DOCUMENTS

| | | |
|---|---|---|
| AU | 2010342713 | 4/2012 |
| AU | 2010342749 | 4/2012 |
| WO | WO2011085555 | 7/2011 |

*Primary Examiner* — Mohammed S. Alawadi
(74) *Attorney, Agent, or Firm* — Baumgartner Patent Law, LLC; Marc Baumgartner

(57) ABSTRACT

A method of manufacturing engineered wood is provided, the method including: feeding wood through a processor while exposing the wood to compressive and tensile forces to produce naturally oriented strands of fibers; adding an adhesive to naturally oriented strands of fibers to provide adhesive covered strands; feeding the adhesive covered strands into a press; applying a first pressure to the adhesive covered strands to provide a pressed wood with a selected first dimension and a selected second dimension; and applying a second pressure normal to the first pressure to the pressed wood to provide an engineered wood having the selected first dimension, the selected second dimension and a selected third dimension and a selected density. An installation for manufacturing the engineered wood is also provided.

17 Claims, 15 Drawing Sheets

(56) References Cited

U.S. PATENT DOCUMENTS

| | | | |
|---|---|---|---|
| 5,279,691 | A | 1/1994 | Stickland |
| 5,505,238 | A * | 4/1996 | Fujii ......................... B27L 7/00 144/353 |
| 7,537,031 | B2 | 5/2009 | Jarck |
| 7,537,669 | B2 | 5/2009 | Jarck |
| 8,268,430 | B2 | 9/2012 | Johnson et al. |
| 8,468,715 | B2 | 6/2013 | Thomas et al. |
| 2005/0000185 | A1 | 1/2005 | Edgar et al. |
| 2007/0144663 | A1 | 6/2007 | Barker et al. |
| 2008/0000548 | A1 | 1/2008 | Liu et al. |
| 2008/0110565 | A1 | 5/2008 | Parker |
| 2010/0119857 | A1 | 5/2010 | Johnson et al. |
| 2012/0076975 | A1 | 3/2012 | Parker |

* cited by examiner

METHOD AND SYSTEM FOR THE PRODUCTION OF MANUFACTURED WOOD

CROSS REFERENCE TO RELATED APPLICATIONS

This application claims benefit of Canadian Patent Application Serial No. 3053343, filed on Aug. 23, 2019, entitled METHOD AND SYSTEM FOR THE PRODUCTION OF MANUFACTURED WOOD, the contents of which are incorporated herein by reference.

FIELD

The present technology separates wood fibers in strands using an oscillating knurled roller apparatus and then forms the wood fiber strands into manufactured wood of varied and selected densities. More specifically it is a method and system for manufactured reconstituted wood from dead, dry timber.

BACKGROUND

U.S. Pat. No. 8,468,715 discloses a method for forming an engineered wood product from pulpwood, comprising providing a quantity of pulpwood; crushing and scrimming the pulpwood to form a mat; drying in a first drying step the mat in a first pass dryer; applying a resin to the mat; and, drying in a second drying step the mat in a second pass dryer. The drying process controls moisture content using the rate of change between the entering and exiting airflow temperature. The resulting product has a high modulus of elasticity and modulus of rupture. As there are not wood fibers the resultant wood product does not have the strength of an orientated strand board. There is no disclosure to producing manufactured woods of differing densities from wood from the same species of tree.

U.S. Pat. No. 8,268,430 discloses a method for producing a manufactured wood product using less desirable or discarded natural wood and a manufactured wood product produced by the described method. This inventive method comprises utilizing less desirable or discarded natural wood pieces by slicing the wood pieces into elongated strips that are then partially separated into elongate sections that maintain fibrous connectivity between the elongate sections. The elongate sections are dried and covered or impregnated with an adhesive. A second drying follows the adhesive application and the elongated strips are then arranged lengthwise in a mold for cold or hot pressing. This method would not be suitable for dry wood. Cutting does not allow the fibers to retain their natural length, thus reducing the strength of the wood product. There is no disclosure to producing manufactured woods of differing densities from wood from the same species of tree.

U.S. Pat. Nos. 7,537,669 and 7,537,031 disclose methods and apparatus for use in the manufacture of reconstituted or reconsolidated steamed-pressed long fiber wood products. More particularly, the invention relates to methods and apparatus for use in the manufacture of reconstituted or reconsolidated wood products using crushing and steam pressing methods and apparatuses. The logs first have to be conditioned with steam and then are cracked into mats using crushers. As the wood fibers are not orientated along a single axis, the resultant wood product does not have the strength of an orientated strand board. There is no disclosure to producing manufactured woods of differing densities from wood from the same species of tree.

U.S. Pat. No. 5,279,691 discloses a process and apparatus for forming a reconsolidated wood product, and a partially rended natural wood bundle therefor, comprises partially rending natural wood to form a plurality of flexible open lattice work webs each of naturally interconnected wood strands which are generally aligned along a common grain direction with a substantial proportion of the strands in each web being substantially discrete but incompletely separated from each other. Each web is of increased width laterally and correspondingly decreased thickness compared to the natural wood but they may vary in dry wood densities. To avoid this the webs are compacted widthwise to substantially uniform dry wood densities and this may involve weighing the webs and measuring their moisture content. The compacted webs are then abutted width-to-width and partially rended natural wood bundles of preselected widths and dry wood densities are cut from the mat. The bundles may then be at least partly superposed, compressed and bonded together to form the desired product. As the wood fibers are not orientated along a single axis, the resultant wood product does not have the strength of an orientated strand board. The product produced by the rending is a lattice or web. There is no disclosure to producing manufactured woods of differing densities from wood from the same species of tree.

U.S. Pat. No. 4,695,345 discloses a method and apparatus for forming a reconsolidated wood product from natural wood which has been rended to form flexible open lattice work webs (14) of naturally interconnected wood strands. The webs (14) are laid one over the other in overlapping fashion, treated with a bonding agent, and compressed in a compression apparatus (100) having two members (102, 104) which are cyclically moved towards each other, to effect compression of the webs, and then moved away from each other to permit further webs to be positioned for compression in the compression device. Movement of the webs through the apparatus is effected by engaging the bonded webs, after compression and when the members (102, 104) are moved away from each other, so as to draw following laid in webs (14) into the space between the members (102, 104). As the wood fibers are not orientated along a single axis, the resultant wood product does not have the strength of an orientated strand board. The product produced by the rending is a lattice or web. There is no disclosure to producing manufactured woods of differing densities from wood from the same species of tree.

U.S. Pat. No. 4,711,689 describes a process for forming a reconsolidated wood product, wherein a bonding agent is applied to a lattice work web of interconnected wood strands that are subsequently subjected to compression in order to consolidate the interconnected wood strands into the reconsolidated wood product. A wax is applied to the wood strands before the application of the bonding agent in order to limit the pick-up of the bonding agent by the wood strands. As the wood fibers are not orientated along a single axis, the resultant wood product does not have the strength of an orientated strand board. The product produced by the rending is a lattice or web. There is no disclosure to producing manufactured woods of differing densities from wood from the same species of tree.

U.S. Pat. No. 4,711,684 discloses a process for the production of reconsolidated wood products. The patent describes a process for the partial rending of wood to form a flexible open lattice work web of naturally interconnected wood strands that are generally aligned along a common grain direction. The rending describe within the patent is achieved by rolling the natural wood between a pair of rollers, arranged with generally parallel axes, so as to engage the natural wood from either side with repetitive back and forth movements of one roller relative to the other roller. As the wood fibers are not orientated along a single axis, the resultant wood product does not have the strength of an orientated strand board. The product produced by the rending is a lattice or web. There is no disclosure to producing manufactured woods of differing densities from wood from the same species of tree.

U.S. Pat. No. 4,704,316 discloses a reconsolidated wood product (22) formed by compressing and bonding natural wood which has been rended to form open lattice work webs (14) of naturally interconnected wood strands. The webs (14) are laid over each other in overlapping fashion so as to extend at an angle to the direction of extent of the product (22), with opposite ends of the webs being closest to respective opposed surfaces (60, 64) of the product. As the wood fibers are not orientated along a single axis, the resultant wood product does not have the strength of an orientated strand board. The product produced by the rending is a lattice or web. There is no disclosure to producing manufactured woods of differing densities from wood from the same species of tree.

United States Patent Application No. 20120076975 and 20080110565 disclose a composite wood product and its method of manufacture. The wood product comprises aligned, substantially straight wood strands cut from veneer, disposed side by side lengthwise in substantially parallel relationship with adhesive bonding together the strands. The product is produced in a billet having a width in the range of about 3 ft. to 12 ft. and with a thickness in the range of about 1.1 inches to 2 inches. The strand ends are distributed in a specific pattern that approximates maximizing the minimum distance between strand ends. The wide sides of the billet are coated with a dark colored resin. The billet may be sawn lengthwise into sizes used for joists and rafters. Such a sawn product (e.g. 1.5" by 9.25") has the wide sides a dark resin color and the narrow sawn sides mostly wood colored. The strands are parallel to its length. The process involves cutting the wood to produce strands. There is no disclosure to producing manufactured woods of differing densities from wood from the same species of tree.

United States Patent Application No. 20080000548 discloses a method of making engineered strand wood products in relation to a number of different possible criteria is provided. Such a method may involve any combination of different screening procedures to determine the best wood sources from which individual strands may be prepared. Such screening procedures may include initial determinations of certain physical characteristics of individual logs, further or initial determinations of certain physical characteristics of portions of sawn logs, further or initial determinations of certain physical characteristics of individual strands, and any combinations thereof. Additionally, after the initial physical characteristic sorting is completed, optionally the wood may be cut into uniformly sized and shaped strands for incorporation within a target strand product. Still further, such strands, in substantially uniform size and shape, as well as substantially uniform physical characteristics, may then be incorporated into a target strand product in specific predetermined configurations. Such various possible combinations of screening procedures and/or selective stranding processes results in strand products (boards, lumber, and the like) of improved properties over previously made strand products. Thus, encompassed within this invention are processes involving each of these procedures either individually or in combination with other sequential processes for the production of desired strand products. The process involves cutting the wood to produce strands. There is no disclosure to producing manufactured woods of differing densities from wood from the same species of tree.

United States Patent Application No. 20070144663 discloses a process for the production of engineered wood products, or oriented strand wood products, having certain desired or predetermined properties by selection of the strands used in the products. The present teachings provide a process which has enhanced utilization of wood resources, reduced product variability, and can produce engineered wood product of various grades and properties on the same production line. The process involves cutting the wood to produce strands. There is no disclosure to producing manufactured woods of differing densities from wood from the same species of tree.

United States Patent Application No. 20050000185 discloses a method of forming a composite beam includes cutting an elongated piece of wood to produce strands having cross sections with a substantially symmetrical equilateral polygonal shape. Resin is then applied to the strands, and the strands are formed into a composite beam. The process involves cutting the wood to produce strands. There is no disclosure to producing manufactured woods of differing densities from wood from the same species of tree.

Australian Patent Application No. 2010342749 discloses methods of preparing wood for use in a manufactured wood product. The methods advantageously include providing a wood piece and breaking at least a portion of the naturally occurring, generally elongate internal structure. Methods of making manufactured wood products are also described herein. These methods advantageously include additionally heat-treating the wood pieces, applying an adhesive to the wood pieces, drying the wood pieces, and pressing the wood pieces in a mold. The process involves cutting the wood to produce strips and then breaking the strips laterally. This reduces the strength of the product. There is no disclosure to producing manufactured woods of differing densities from wood from the same species of tree.

Australian Patent Application No. 2010342713 discloses a manufactured *eucalyptus* wood product comprises a plurality of adhesively bonded and pressed *eucalyptus* wood strips, each of the *eucalyptus* wood strips is of generally the same length and comprises a naturally-occurring, generally elongate internal structure extending generally along one axis of the strip that has been at least partially laterally broken and at least permeated by an adhesive. The *eucalyptus* wood strips are oriented roughly parallel to one another along their length. The manufactured *eucalyptus* wood product comprises an amount of adhesive in the range of about 0.1% by weight to about 15% by weight. The manufactured *eucalyptus* wood product has a wood grain appearance or look. The manufactured *eucalyptus* wood products may have aesthetic and structural qualities that are suitable for high traffic, high visibility applications such as wood flooring. The process involves breaking the wood strips laterally. This reduces the strength of the product. There is no disclosure to producing manufactured woods of differing densities from wood from the same species of tree.

WO2011085555 discloses a system for producing manufactured wood products includes a spindleless lathe (22), a rolling machine (88) or crushing machine (26), a cutting machine (24), a heat-treating unit (28), a first dryer (124), an adhesive application unit (30), a second dryer (126), a pressing unit (32), and a third dryer (128). The system can be centrally and/or remotely operated. In some embodiments, the system is fully automated. This reduces the strength of the product. There is no disclosure to producing manufactured woods of differing densities from wood from the same species of tree.

United States Patent Application No. 20100119857 discloses a method for producing a manufactured wood product using less desirable or discarded natural wood and a manufactured wood product produced by the described method. This inventive method comprises utilizing less desirable or discarded natural wood pieces by slicing the wood pieces into elongated strips that are then partially separated into elongate sections with alternating step sections that maintain fibrous connectivity between the elongate sections. The elongate sections are impregnated with an adhesive and pressed in a mold. The process involves cutting the wood to produce strips. There is no disclosure to producing manufactured woods of differing densities from wood from the same species of tree.

None of the foregoing methods or systems are specifically selected to manufacture engineered wood products from dead timber that has dried in the field. What is needed is an apparatus that separates the wood fibers into strands. It would be preferable if the strands remained in a parallel orientation, or near parallel orientation, in other words, in their natural orientation, without the need for an orientation step. It would be preferable if the apparatus was able to separate knots and other imperfections as well as to remove any non-stranded materials. What is also needed is an apparatus that presses the strands into preselected sizes of lumber. It would be preferable if the apparatus was also able to press the strands into preselected densities, such that the resultant manufactured wood could range in density from that of a soft wood to that of a hardwood, simply through the pressing mechanism.

SUMMARY

The present technologies are specifically selected to manufacture engineered wood products from dead timber that has dried in the field. There is an apparatus that separates the wood fibers into strands, while retaining them in a parallel orientation, or near parallel orientation, without the need for an orientation step. The apparatus is able to separate knots and other imperfections as well as remove any non-stranded materials. Another apparatus in the system presses the strands into preselected sizes of lumber. The apparatus is also able to press the strands into preselected densities, such that the resultant manufactured wood can range in density from that of a soft wood to that of a hardwood, simply through the pressing mechanism and not through the addition of specific resins.

In one embodiment, a mechanical fiber processor for producing naturally oriented strands of fibers from timber is provided, the mechanical fiber processor including: a framework, which has a top, a base which opposes the top, and a pair of vertical member therebetween; and a plurality of processing units, each processing unit comprising a frame which includes a first slider and a second slider each which slides vertically on a vertical member of the pair of vertical members, a vertically disposed ram which is attached to the framework and the frame and extends therebetween, a surface contoured first roller which is rotatably mounted on the first slider, a first motor which is mounted on the second slider and is in motive relation with the surface contoured first roller, a horizontal slider, which is slidably mounted on the pair of vertical members, a horizontally disposed ram which is attached to the framework and the horizontal slider, a surface contoured second roller which is rotatably mounted on the horizontal slider, and a second motor which is mounted on the horizontal slider and is in motive relation with the surface contoured first roller.

The mechanical fiber processor may further comprise a chute between each processing unit.

The mechanical fiber processor may further comprise a waste conveyor below the chutes and processing units.

In the mechanical fiber processor the horizontally disposed ram may have a horizontal travel of at least about 2 inches.

In the mechanical fiber processor the surface contoured first roller may be knurled.

In the mechanical fiber processor the surface contoured second roller may be circumferentially grooved.

In the mechanical fiber processor the first motor, the second motor, the vertically disposed ram and the horizontally disposed ram may be hydraulically actuated.

The mechanical fiber processor may further comprise a plurality of variable displacement hydraulic pumps which are in fluid communication with the first motor, the second motor, the vertically disposed ram and the horizontally disposed ram.

The mechanical fiber processor may further comprise a digital controller which is in electronic communication with the processing units.

In the mechanical fiber processor, the digital controller may be in electronic communication with the plurality of variable displacement hydraulic pumps.

In the mechanical fiber processor, the digital controller may be configured to control the horizontally disposed rams such that the horizontally disposed rams in adjacent processing units oscillate in an opposing direction.

In the mechanical fiber processor, the digital controller may be configured to control rotating and oscillating of the surface contoured second roller such that the surface contoured second roller is rotating while oscillating.

In the mechanical fiber processor, the vertically disposed ram may have a travel of about 24 inches and the horizontally disposed ram has a travel of about 4 inches.

In the mechanical fiber processor, the surface contoured first roller and the surface contoured second roller may be directly driven by the first motor and the second motor, respectively.

In the mechanical fiber processor, the first slider and the second slider may comprise a resilient liner.

In the mechanical fiber processor, the vertically disposed ram and the horizontally disposed ram may be variable stroke length rams.

In another embodiment, a method of processing wood to produce naturally oriented strands of fibers is provided, the method comprising feeding the wood through a processor while exposing the wood to compressive and tensile forces.

In the method, the feeding may be effected by a plurality of surface contoured first rollers.

In the method, the plurality of surface contoured first rollers and the plurality of surface contoured second rollers may exert the compressive forces on the wood.

In the method, the plurality of surface contoured second rollers may exert the tensile forces on the wood.

In the method, the plurality of surface contoured second rollers may oscillate laterally to exert the tensile forces on the wood.

In the method, adjacent surface contoured second rollers may oscillate with reverse amplitudes, with one being positive and the other being negative.

The method may further comprise the first surface contoured rollers and the second surface contoured rollers releasing non-stranded wood.

In another embodiment, a method of processing wood to produce naturally oriented strands of fibers is provided, the method comprising exerting a motive force on the wood with a first knurled roller, exerting a compressive force with the first knurled roller and a second circumferentially grooved roller which are pressed towards one another with an actuator and simultaneously exerting a lateral oscillating tensile force on the wood with the second circumferentially grooved roller.

The method may further comprise releasing non-stranded wood.

The method may further comprise collecting and transporting the non-stranded wood on a waste conveyor.

In the method, adjacent knurled second rollers may oscillate with reverse amplitudes, with one being positive and the other being negative.

In another embodiment, a two-axis press for manufacturing engineered wood is provided, the two-axis press comprising: a framework; a first actuator which includes a distal end and a proximal end, the distal end attached to the framework; a moveable wall which is attached to the proximal end of the first actuator; a second actuator which is disposed normal to the first actuator and which includes a distal end and a proximal end, the distal end attached to the framework; a press plate which is attached to the proximal end of the second actuator and is disposed normal to the moveable wall; and a pressing chamber, the pressing chamber including two stationary walls with an end wall therebetween, and one of the stationary walls defining an aperture which is sized to slidably engage the press plate and is located proximate the end wall.

In the two-axis press, the actuators may be variable stroke length hydraulic rams.

The two-axis press may further comprise variable displacement hydraulic pumps which are in fluid communication with the variable stroke length hydraulic rams.

The two-axis press may further comprise a digital controller.

In the two-axis press the digital controller may be in electronic communication with the variable displacement hydraulic pumps.

In the two-axis press the digital controller may be configured to control the variable stroke length hydraulic rams to provide selected dimensions and a selected density of an engineered wood.

In the two-axis press the stationary walls may include a heat source.

In another embodiment, a method of manufacturing an engineered wood having selected dimensions and a selected density from a wood source is provided, the method comprising: adding an adhesive to strands of wood fibers to provide adhesive covered strands; feeding the adhesive covered strands into a press; applying a first pressure to the adhesive covered strands to provide a pressed wood with a selected first dimension and a selected second dimension; and applying a second pressure normal to the first pressure to the pressed wood to provide an engineered wood having the selected first dimension, the selected second dimension and a selected third dimension and a selected density.

In the method, the strands of wood fibers may be arranged linearly.

In the method, the strands of wood fibers may be naturally oriented strands of wood fibers.

In the method, the adhesive is a pressure and temperature activated dry chemical bonding agent and heat may be applied during the application of pressure.

The method may be under control of a digital controller.

The method may further comprise determining a density of a feedstock and determining the first pressure and the second pressure required to provide the selected density.

In yet another embodiment, an installation for manufacturing engineered wood is provided, the installation comprising:

a mechanical fiber processor for producing naturally oriented strands of fibers from timber, the mechanical fiber processor including: a framework, which has a top, a base which opposes the top, and a pair of vertical member therebetween; and a plurality of processing units, each processing unit comprising a frame which includes a first slider and a second slider each which slides vertically on a vertical member of the pair of vertical members, a vertically disposed ram which is attached to the framework and the frame and extends therebetween, a surface contoured first roller which is rotatably mounted on the first slider, a first motor which is mounted on the second slider and is in motive relation with the surface contoured first roller, a horizontal slider, which is slidably mounted on the pair of vertical members, a horizontally disposed ram which is attached to the framework and the horizontal slider, a surface contoured second roller which is rotatably mounted on the horizontal slider, and a second motor which is mounted on the horizontal slider and is in motive relation with the surface contoured first roller and a two-axis press, the two-axis press comprising: a framework; a first actuator which includes a distal end and a proximal end, the distal end attached to the framework; a moveable wall which is attached to the proximal end of the first actuator; a second actuator which is disposed normal to the first actuator and which includes a distal end and a proximal end, the distal end attached to the framework; a press plate which is attached to the proximal end of the second actuator and is disposed normal to the moveable wall; and a pressing chamber, the pressing chamber including two stationary walls with an end wall therebetween, the stationary walls including a heat source, and one of the stationary walls defining an aperture which is sized to slidably engage the press plate and is located proximate the end wall.

The installation may further comprise a metering unit between the mechanical fiber processor and the two-axis press.

The installation may further comprise a dehydrator upstream of metering unit.

The installation may further comprise a waxing chamber, the waxing chamber upstream of the two-axis press.

The installation may further comprise an adhesive distributor, the adhesive distributor upstream of the two-axis press.

The installation may further comprise a dehydrator downstream of the mechanical fiber processor, a metering unit downstream of the dehydrator, a waxing chamber downstream of the metering unit and an adhesive distributor downstream of the waxing chamber and upstream of the two-axis press.

In another embodiment, a method of manufacturing engineered wood is provided, the method comprising: feeding wood through a processor while exposing the wood to compressive and tensile forces to produce naturally oriented strands of fibers; adding an adhesive to naturally oriented strands of fibers to provide adhesive covered strands; feeding the adhesive covered strands into a press; applying a first pressure to the adhesive covered strands to provide a pressed wood with a selected first dimension and a selected second dimension; and applying a second pressure normal to the first pressure to the pressed wood to provide an engineered wood having the selected first dimension, the selected second dimension and a selected third dimension and a selected density.

In another embodiment, an engineered wood is provided, the engineered wood manufactured by:

- simultaneously feeding a log or wood from a log through a processor that subjects the log or the wood from the log simultaneously to compressive and tensile forces to produce naturally oriented strands of fibers;
- adding an adhesive to the naturally oriented strands of fibers to produce adhesive covered strands;
- subjecting the adhesive covered strands to a first compressive force to provide a wood product with a first selected dimension and a second selected dimension;
- and subjecting the wood product to a second compressive force normal to the first compressive force to provide an engineered wood with naturally oriented strands, the first selected dimension, the second selected dimension, a third selected dimension and a selected density.

In the engineered wood, the tensile force may be provided by a circumferentially grooved roller.

In another embodiment, an engineered wood is provided, the engineered wood including strands of fibers that are disposed substantially parallel to one another.

The engineered wood may have a selected density.

In the engineered wood, the selected density may range from about 350 kilograms per meter cubed to about 1000 kilograms per meter cubed.

In another embodiment, a metering unit for use with an installation for manufacturing engineered wood is provided, the metering unit comprising: a chamber including a first end, a second end, a bottom and a top with a plurality of slots, the slots extending from the second end towards the first end; a hydraulically actuated push gate, the push gate slidably movable towards and away from the first end and the second end; a discharge gate at the second end; a plurality of hydraulically actuated hold back fingers; and a plurality of hydraulically actuated discharge fingers, both the hold back fingers and the discharge fingers moveable between an engaged position in which both the hold back fingers and the discharge fingers are located in the slots and a disengaged position in which the hold back fingers and the discharge fingers are above the chamber, the hold back fingers moveable towards and away from the first end and the second end.

The metering unit may further comprise a bumper which is mounted to an inner side of the push gate with biasing members.

In the metering unit, the push gate and bumper may be slidably mounted on the chamber.

In the metering unit, the discharge fingers may be moveable towards and away from the first end and the second end.

FIGURES

Figure 8A:
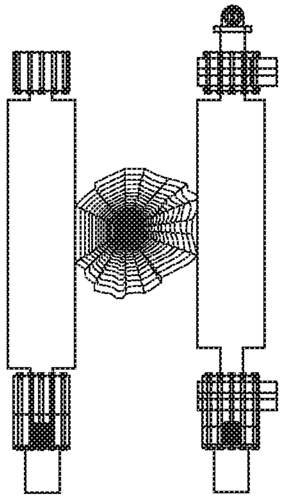
Figure 8B:
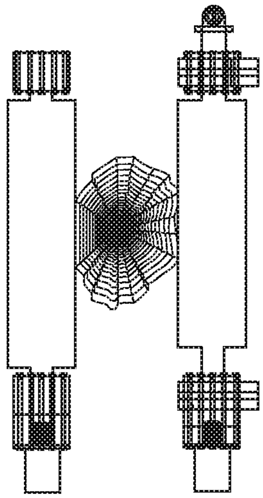
Figure 8C:
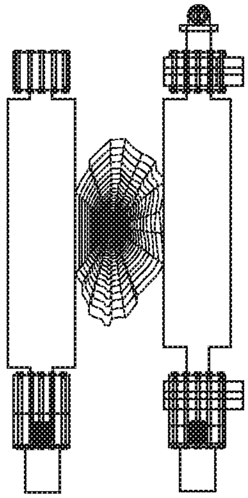
Figure 8D:
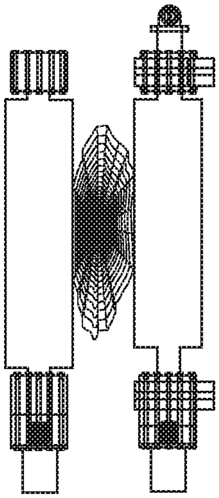
Figure 8E:
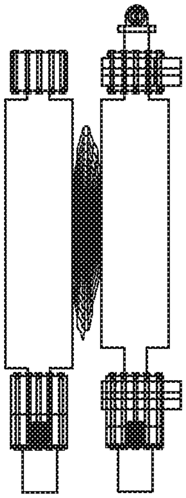

FIG. 8A is a front view of the log in a processing unit before it is processed; FIG. 8B is a sectional view of the log in a processing unit in the early stages of processing; FIG. 8C is a sectional view of the log in a processing unit further downstream; FIG. 8D is a sectional view of the log as it begins to be stranded; and FIG. 8E is an end view of the strands in a processing unit proximate the exit end of the mechanical fiber processor.

Figure 9:
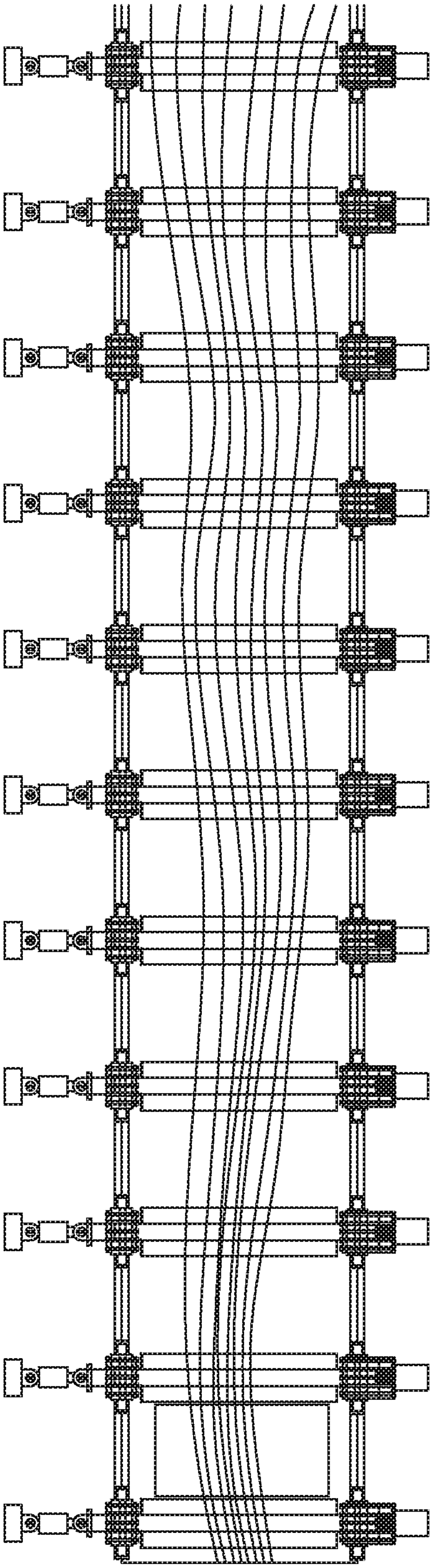

FIG. 9 is a top view of the log undergoing processing to provide naturally oriented strands of fibers.

Figure 10:
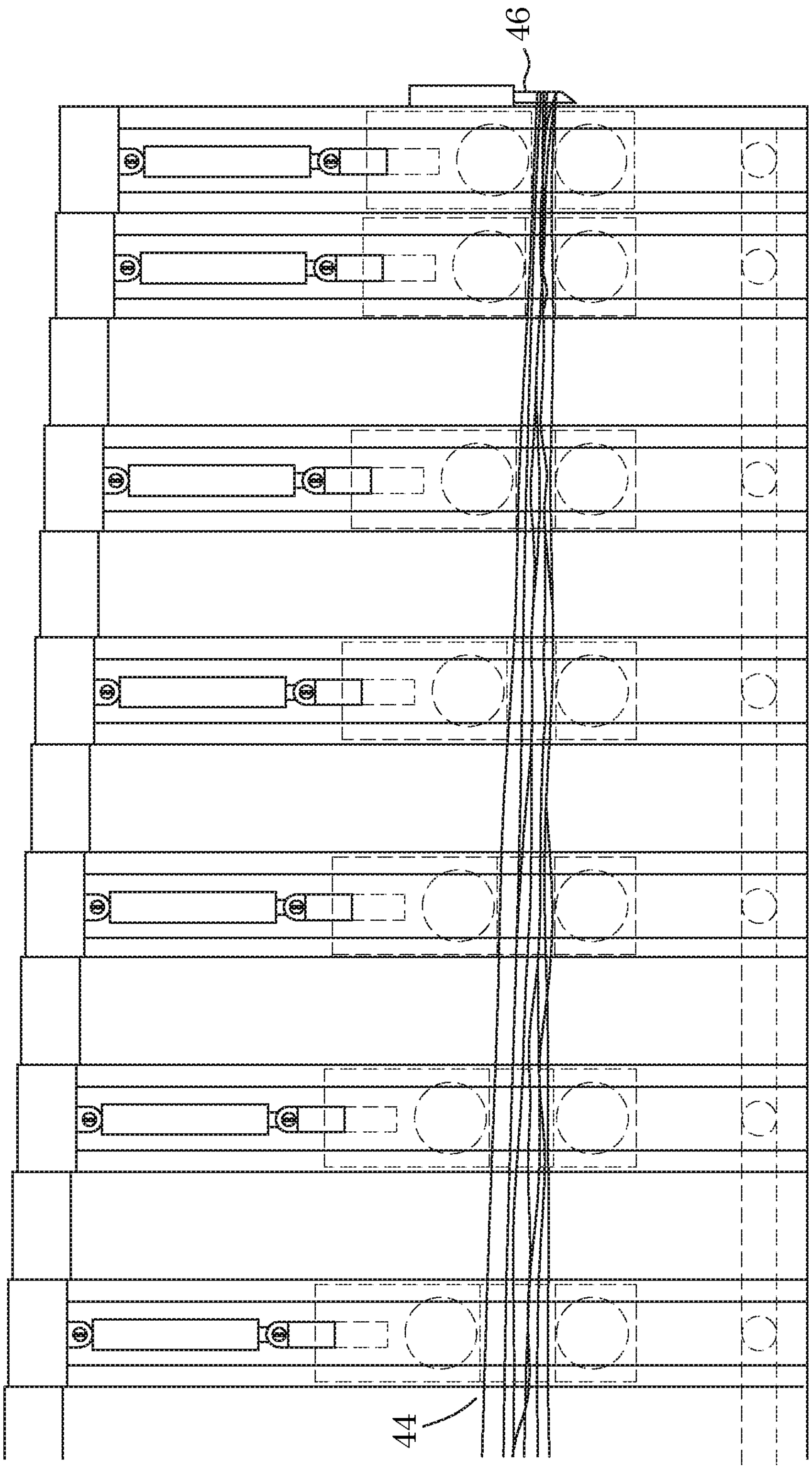

FIG. 10 is a side view of the log undergoing processing to provide naturally oriented strands of fibers.

Figure 11A:
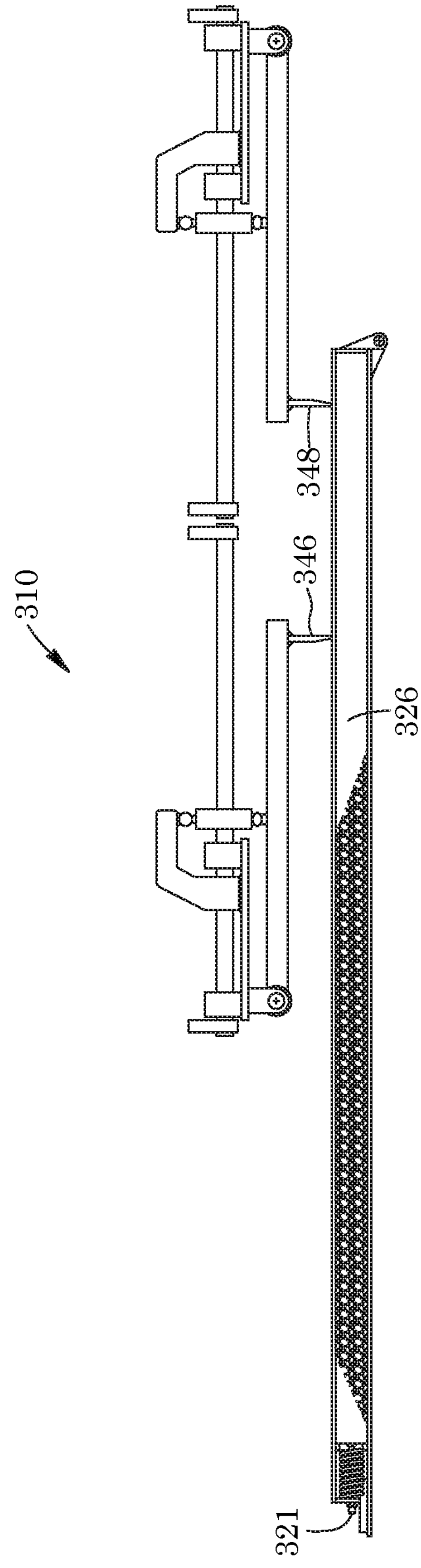
Figure 11B:
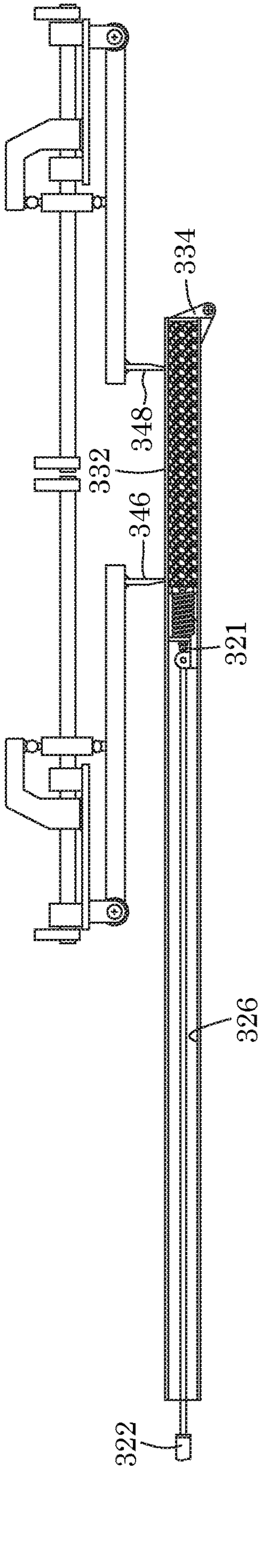
Figure 11C:
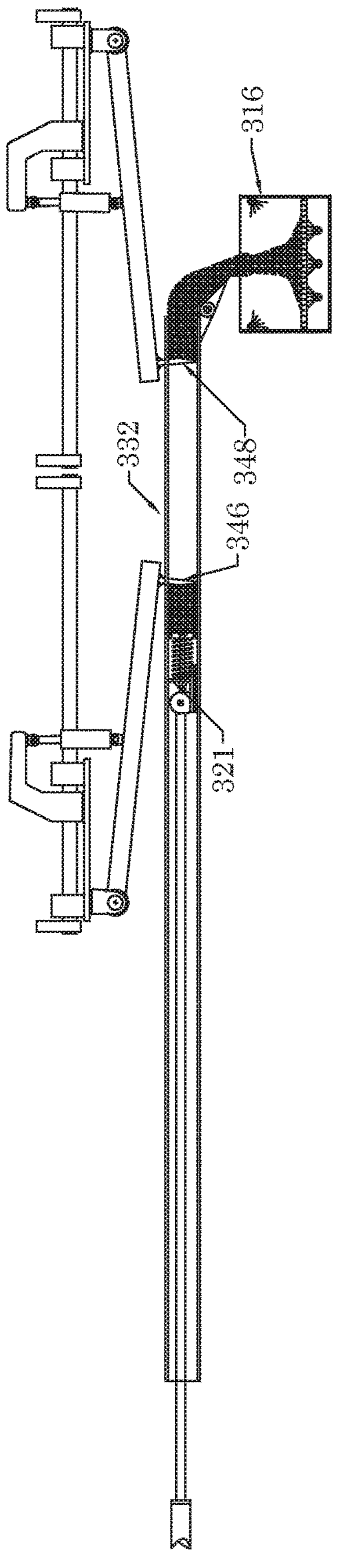

FIG. 11A shows the strands of fibers loaded into the metering unit. FIG. 11B shows the strands of fibers being aligned and compacted into a bundle. FIG. 11C shows the fibers being pushed into the wax application chamber where they are sprayed with a slack wax.

Figure 12C:
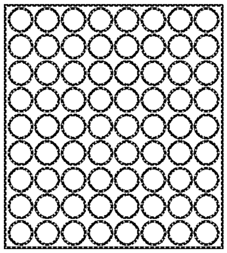
Figure 12B:
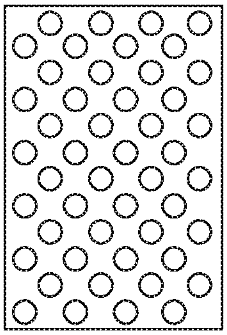
Figure 12A:
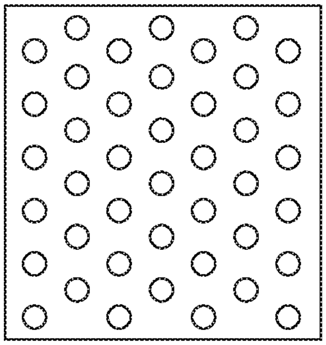

FIG. 12A is an end view of the strands in the two-axis press before the rams are actuated; FIG. 12B is an end view of the strands in the two-axis press after the vertical ram has been actuated; and FIG. 12C is an end view of the strands in the two-axis press after the horizontal ram has been actuated.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Slider—in the context of the present technology, a slider is a part which moves over another part. Rollers, wheels, low friction surfaces, ball bearings in races and the like all allow a part to act as a slider.

DETAILED DESCRIPTION

Figure 1:
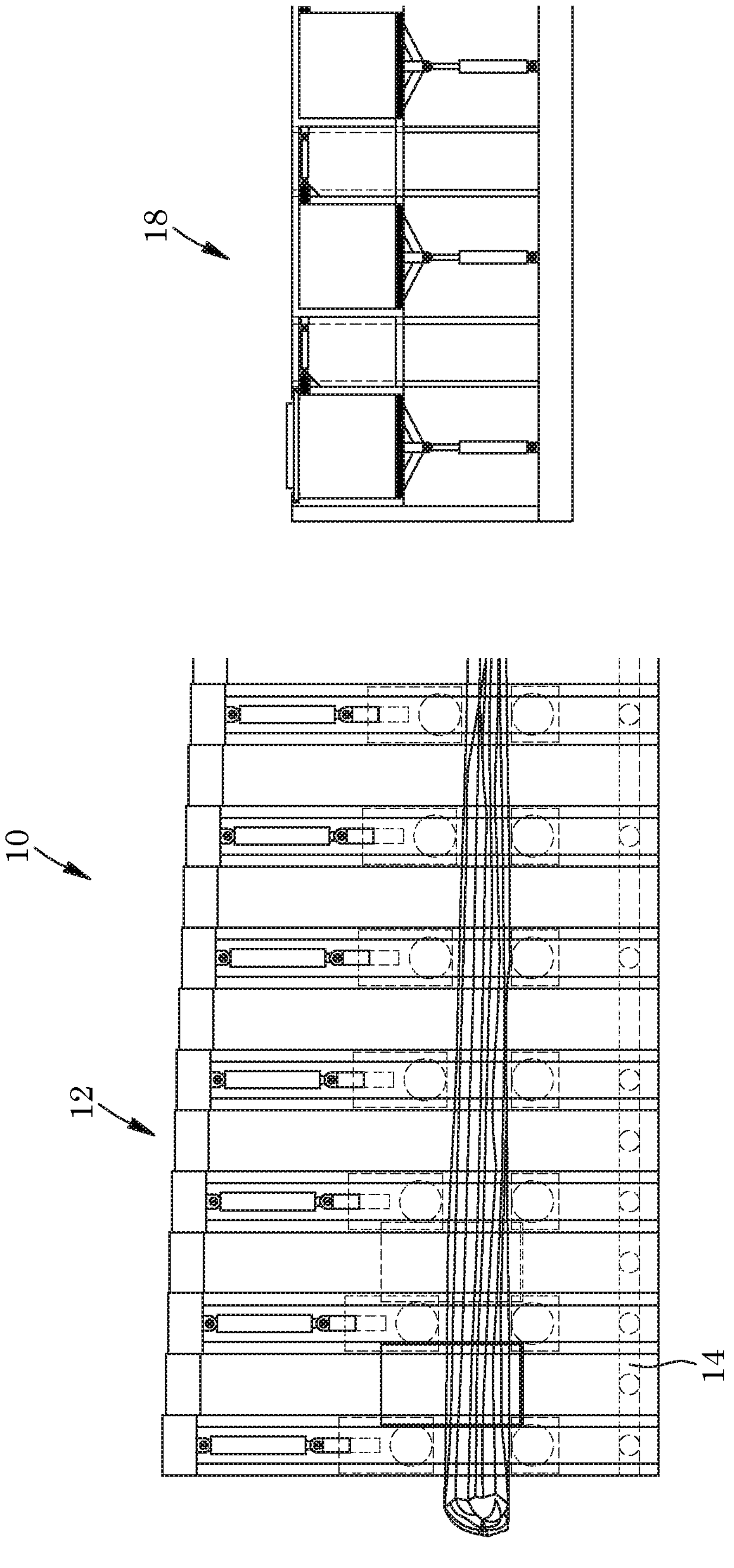
FIG. 1 is a side view of the system of the present technology.

As shown in FIG. 1 a system, generally referred to as 10 includes a mechanical fiber processor, generally referred to as 12, a conveyer 14 and a two-axis press, generally referred to as 18. The system 10 manufactures engineered wood from waste wood, including, but not limited to dead, dry standing timber and slash. As the timber is dead and standing, it is air dry.

Figure 2:
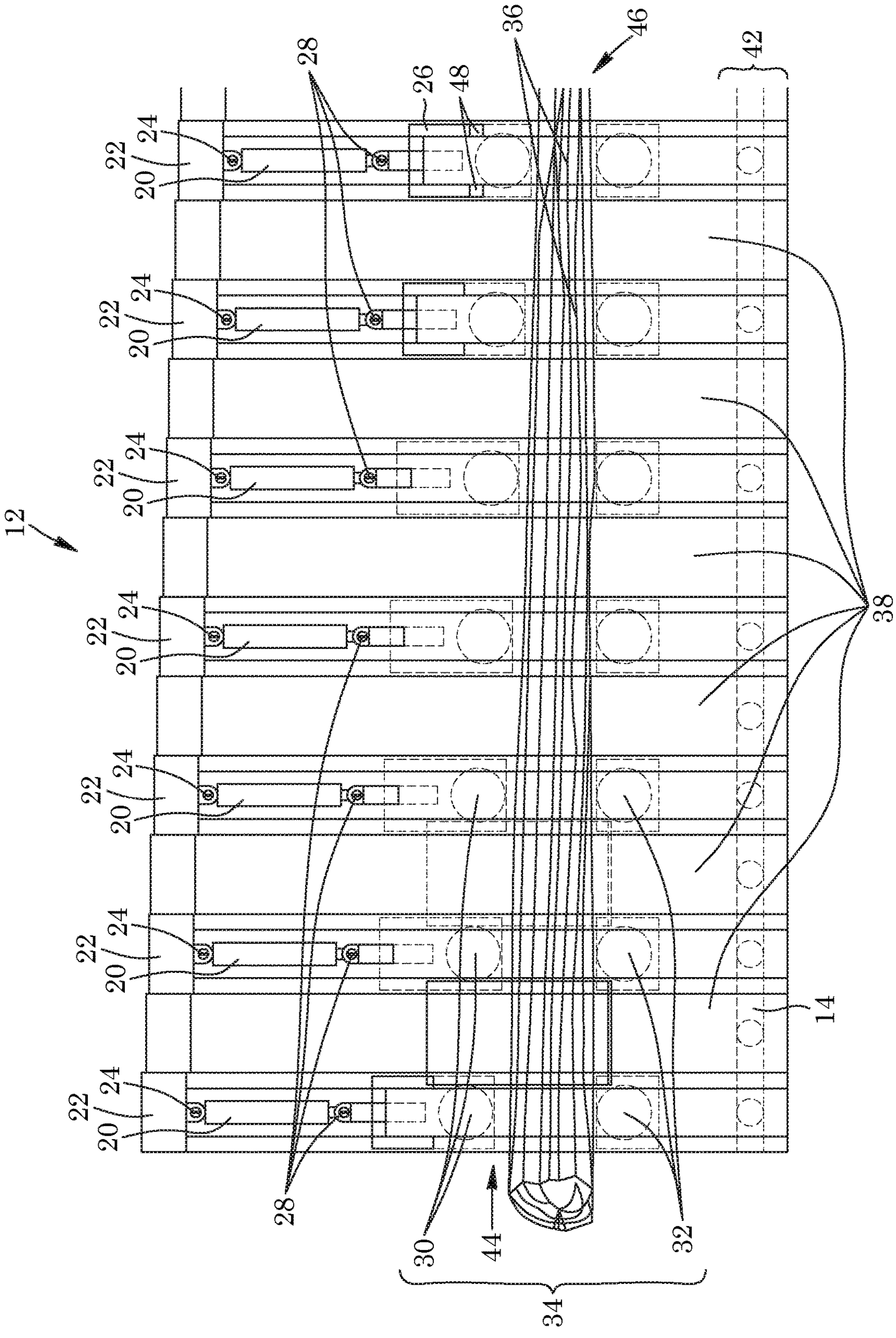
FIG. 2 is a longitudinal sectional view of the mechanical fiber processor of the system of FIG. 1.

As shown in FIG. 2, the mechanical fiber processor 12 has a plurality of vertically disposed rams 20, with each ram 20 attached to a framework 22 at a first end 24. The rams have about 12 inches to about 50 inches of travel, preferably about 20 inches to about 30 inches of travel and most preferably about 24 inches of travel. Each ram 20 is attached to a frame 26 at a second end 28, which in turn is attached to an upper motive roller 30, thus there are a plurality of frames 26 and a plurality of upper motive rollers 30. A plurality of lower separating rollers 32 are seated below the upper motive rollers 30 to provide roller pairs 34 consisting of an upper motive roller 30 and a lower separating roller 32. Each separating roller 32 is aligned with a frame 26, an upper motive roller 30 and an actuator 20 which is preferably a ram 20. These components are housed in the active stranding zone, generally referred to as 36 of the mechanical fiber processor 12. Between each roller pair 34 is a chute 38 which feeds non-strand wood to the waste conveyor 14 which is below the active stranding zone 36 and the chutes 38 and is in the waste collection zone 42. There is an entry end 44 and an exit end 46. Material guides 48 are located at the sides of the roller pairs 36. A log is seen positioned in the mechanical fiber processor 12. It may or may not extend from the entry end 44 to the exit end 46

Figure 3:
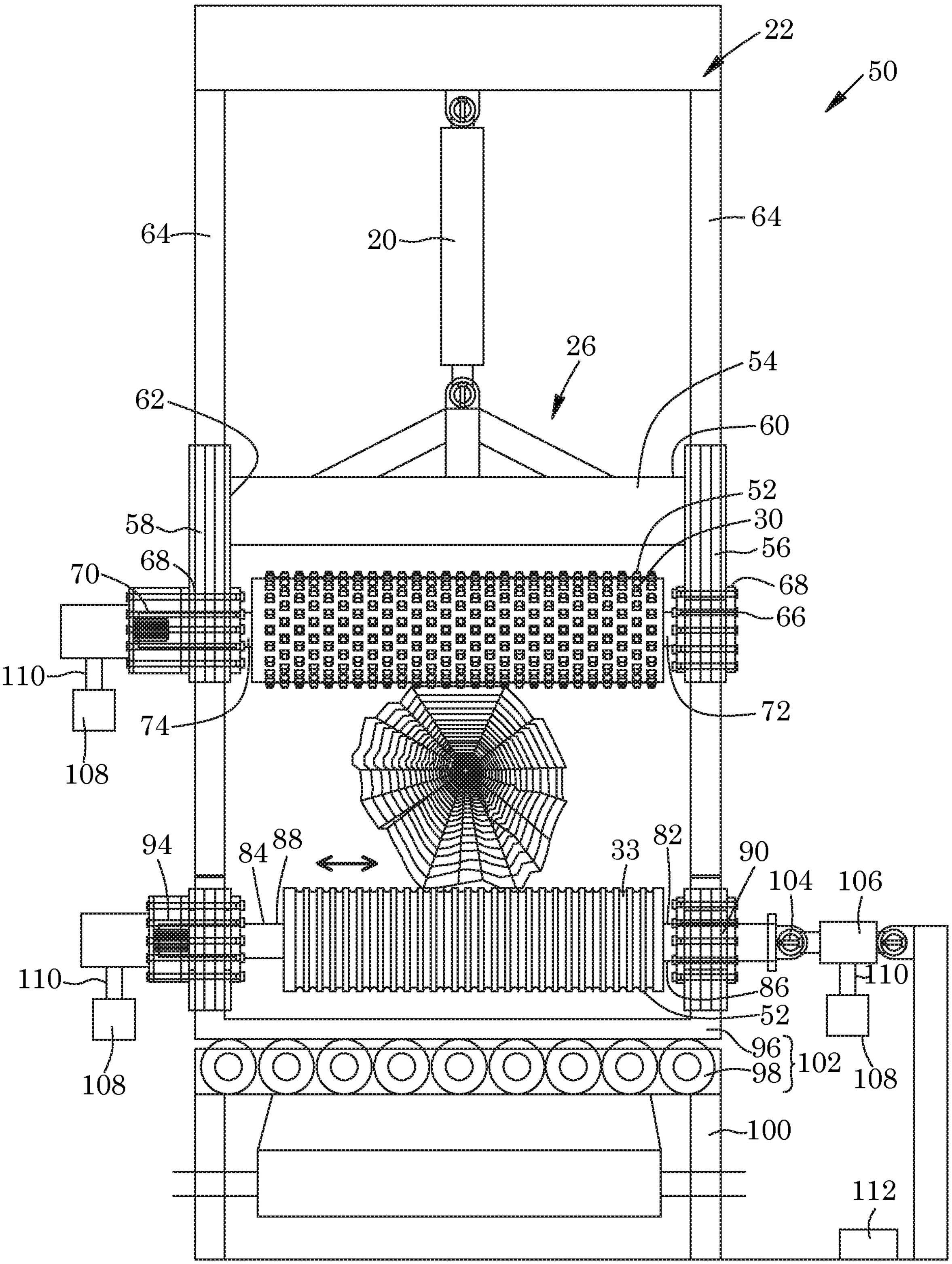
FIG. 3 is longitudinal sectional view of a processing unit of the mechanical fiber processor of FIG. 2.

The details of a processing unit, generally referred to as 50, are shown FIG. 3. A roller pair 36 is shown. The upper motive roller 30 and the lower separating roller 32 have surface contours 52. The surface contours 52 of the upper motive roller 30 are designed to provide traction so that the log is propelled through the mechanical fiber processor 12. The upper motive roller 30 only participates in separating the strands by providing the force on the log and the lower separating roller 32. The surface contour 52 include ridges, knurls, protrusions and the like that are aligned substantially along the central axis of the upper motive rollers 30. In the preferred embodiment, the surface of the upper motive roller 32 machined with about ¼ inch deep grooves circumferentially and longitudinally, forming a small square cut pattern. This is referred to as a knurled surface. The surface of the lower separating roller 32 is machined circumferentially with deeper grooves 33 that are between about ⅓ inch to about ⅔ inch deep and as deep as about ¾ inch deep. The surface contours of the lower separating roller are designed to separate the strands. The peaks of the knurled surface and the peaks left from the circumferential grooves align with one another.

The frame 26 includes a horizontal plate 54 with sliders 56, 58 at each end 60, 62. The ram 20 is attached to the framework 22 and the horizontal plate 54. The sliders 56, 58 have a resilient liner. The sliders 56, 58 are each slidably mounted on a vertical member 64 of the framework 22. A hub 66 is mounted on a proximal end 68 of the first slider 56. An upper motor 70 is mounted on a proximal end 68 of the second slider 58. The upper motive roller 30 has a short axle 72, 74 at each end. The axle 72 is rotatably mounted in the hub 66 at one end and the axle 74 is either attached to the upper motor 70 or is the motor shaft. It is preferably a hydraulic motor and the axle 74 is fixed to the upper motor 70. As the upper motor 70 is a variable speed motor, the rate at which the log is propelled is controlled and can be varied either from log to log and during processing of an individual log.

The lower separating roller 32 has a short axle 82, 84 at each end 86, 88. The axle 82 is rotatably and rotatably mounted in a hub 90 at the first end 86. The other axle 84 is in mechanical communication with a lower motor 94. It is preferably a hydraulic motor. The axle 84 is fixed to the lower motor 94. As the lower motor 94 is a variable speed motor, the rate at which the log is propelled is controlled and can be varied either from log to log and during processing of an individual log.

The hub 90 and the lower motor 94 are mounted on a carry deck (horizontal slider) 96 which rides on idler wheels 98 which are rotatably mounted in a fixed base 100 which is mounted below the hub 90 and the lower motor 94. The carry deck 96 and the idler wheels 98 are the carry deck assembly, generally referred to as 102. The carry deck 96 is attached via a thrust swivel 104 to an actuator 106 which is preferably a ram 106 which is horizontally disposed. The ram 106 urges the carry deck 96 and hence the lower separating roller 32 laterally for example, but not limited to, at least about 2 inches, to at least about 3 inches to at least about 5 inches and preferably about 4 inches. The ram is preferably a variable stroke length ram 106, preferably a Tempasonic® cylinder, which allows for precise positioning as it includes magnetostrictive linear-position sensors. As noted, the travel of the ram 106 is for example, but not limited to, at least about 2 inches, to at least about 3 inches to at least about 5 inches and preferably about 4 inches. The arrow indicates the horizontal oscillation.

The upper motors 70, the lower motors 94 and the rams 20, 104, which in the preferred embodiment are hydraulic, are in fluid communication with variable displacement hydraulic pumps 108 via hydraulic lines 110.

A digital controller 112 with integral limit switches controls the speed, the applied force, ram travel and timing. In a preferred embodiment, adjacent rams 92 oscillate with the same period but opposing one another, in other words they have reverse amplitudes. Preferably, one ram 92 is fully in while the other is fully out, to provide a waveform in the wood as the strands are released with a peak to valley height of about 4 inches. This action is controlled by the digital controller 112 via the variable displacement hydraulic pumps 108. Concomitant rotation and oscillation is also controlled by the digital controller 112. The rate of rotation may be different to the rate of oscillation and will be based on the characteristics of the wood being processed.

Figure 4:
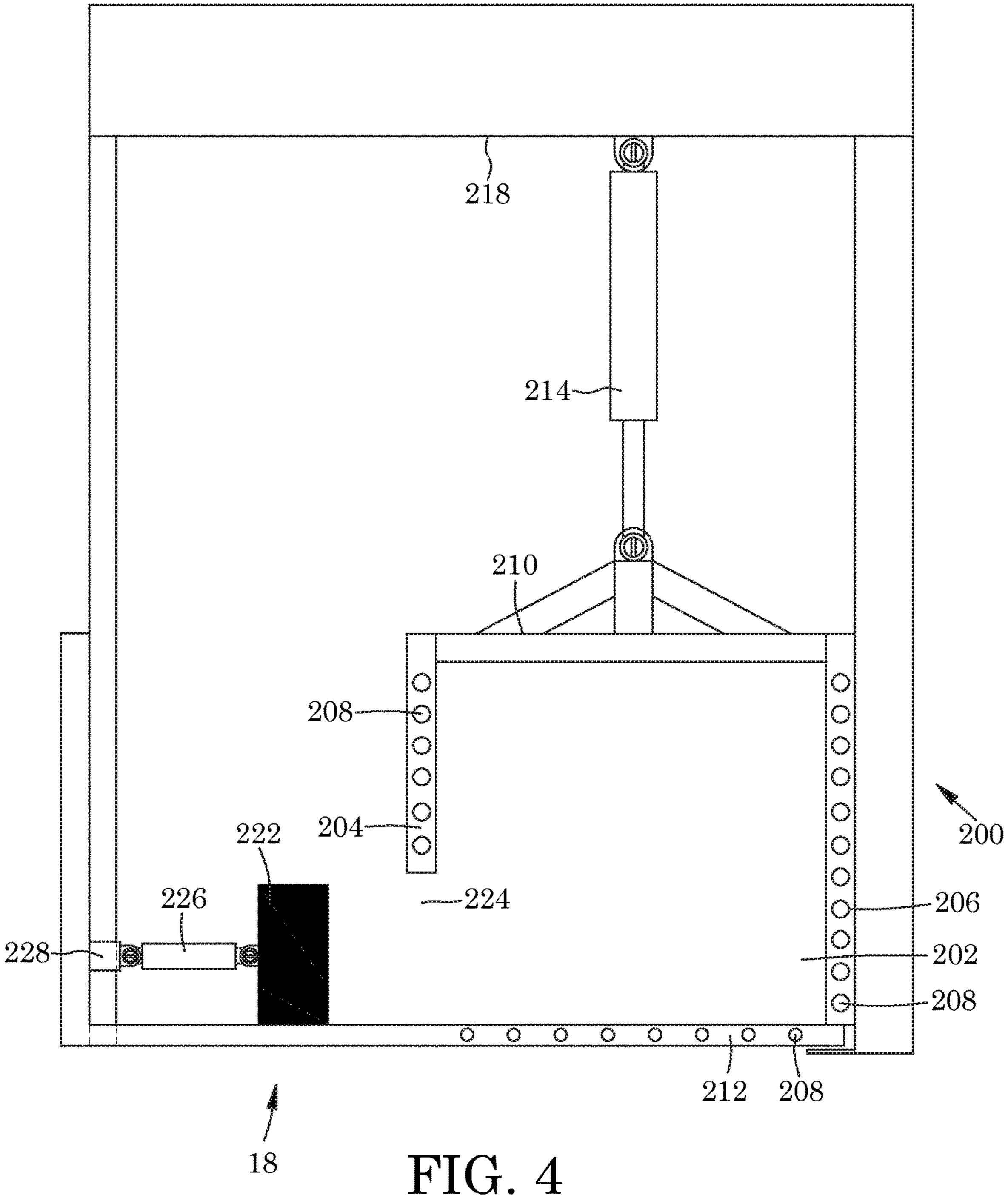
FIG. 4 is front view of the two-axis press of the system of FIG. 1.

As shown in FIG. 4, the two-axis press 18 has a framework 200 which houses a pressing chamber 202. The pressing chamber 202 has a pair of stationary vertical walls 204, 206 which are heated with heater units 208 which can be, but are not limited to pipes for carrying hot water or hot air or can be electrical elements, a vertical press plate which functions as a top dynamic wall 210, and a stationary bottom wall 212 which is also heated with heater units 208 which can be, but are not limited to pipes for carrying hot water or hot air or can be electrical elements. The top dynamic wall 210 is slidably engaged in the walls 204, 206. A vertical press actuator 214, which is preferably a ram 214 is attached to and actuates the top dynamic wall 210. The rams 214 is preferably variable stroke length rams, preferably a Tempasonic® cylinder, which allows for precise positioning as it includes magnetostrictive linear-position sensors. The vertical press ram 214 extends between the top dynamic wall 210 and the top 218 of the framework 200. The adhesive coated strands are within the pressing chamber 202. A lateral press plate 222 is located in an aperture 224 in one of the vertical walls 204 and is sized to be large enough to provide horizontal force on the largest cross section of engineered wood being formed. The aperture 224 is large enough to load a bundle of adhesive coated strands. The lateral press plate 222 is in slidable engagement with the aperture 224. A lateral actuator, which is preferably a press ram 226 is attached to and actuates the lateral press plate 222. The lateral press ram 226 extends between the lateral press plate 222 and a side 228 of the framework 200. The ram 226 is preferably a variable stroke length ram, preferably a Tempasonic® cylinder, which allows for precise positioning as it includes magnetostrictive linear-position sensors.

The two-axis press 18 is under control of variable power and digital control systems. The control system controls speed, temperature, force, time and final dimension of the pressing chamber (in other words, the dimensions of the resultant engineered wood product).

Figure 5:
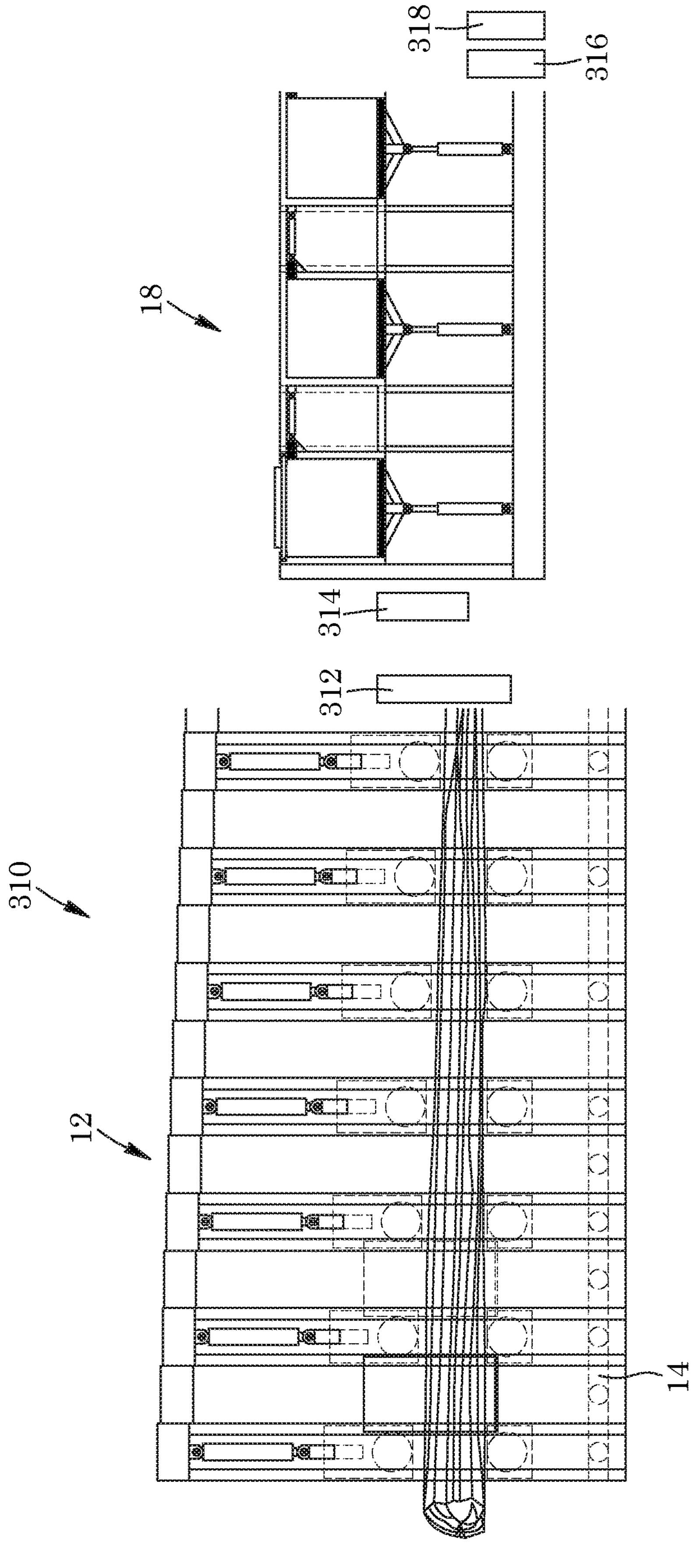
FIG. 5 is a side view schematic of an alternative embodiment system.

As shown in FIG. 5, in an alternative embodiment, the system, generally referred to as 310 includes a mechanical fiber processor, generally referred to as 12, a conveyer 14, a dehydrator 312, a metering unit 314, a waxing chamber 316, an adhesive distributor 318 and a two-axis press, generally referred to as 18. In yet another embodiment, the system includes the mechanical fiber processor, generally referred to as 12, a conveyer 14, a dehydrator 312, a waxing chamber 316, an adhesive distributor 318 and a two-axis press, generally referred to as 18 and does not include the metering unit 314.

Figure 6A:
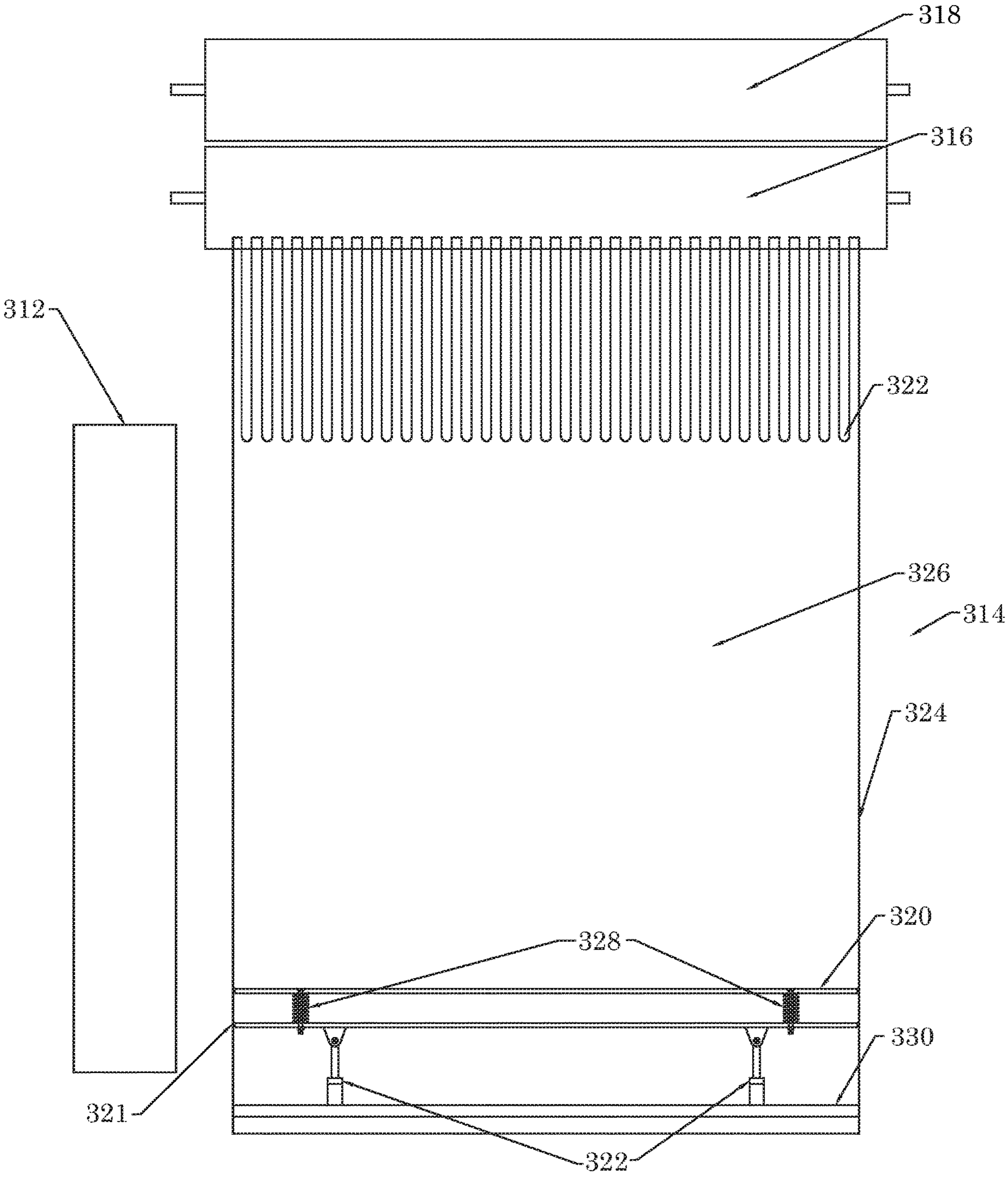
FIG. 6A is a top view of the metering unit of the alternative embodiment.

The details of the metering unit, generally referred to as 314 are shown in FIGS. 6A and B. The metering unit 314 includes a bumper 320 and a push gate 321 under control of hydraulic rams 322 which is slidably engaged with the sides 324 of the chamber 326. A pair of biasing members 328, which may be springs extend between the bumper 320 and the push gate 321. Without being bound to theory, the springs 328 allow the bumper to compensate if the amount of fiber is not even in the chamber 326, thus promoting equal density of the fibers in the bundle. The hydraulic rams 322 are attached to a framework 330. A slotted top 332 is at the opposite end of the chamber 326 and extends towards the push gate 321. The waxing chamber 316 and the adhesive distributor 318 are also shown in FIG. 6A.

Figure 6B:
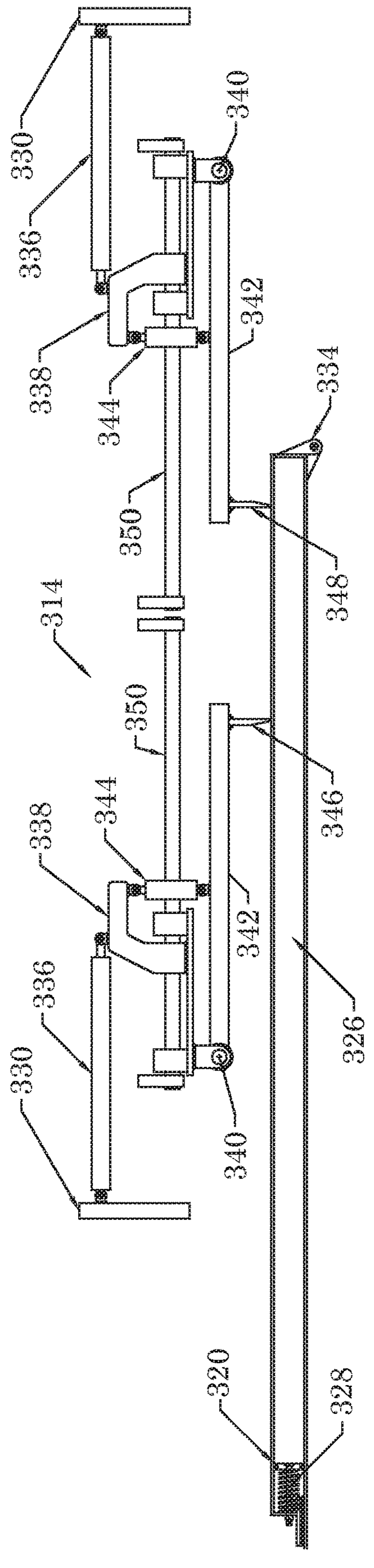
FIG. 6B is a side view of the metering unit of the alternative embodiment.

As shown in FIG. 6B a discharge gate 334 is also at the opposite end of the chamber 326. A pair of arm actuators, which are preferably hydraulic rams 336, are attached to the framework 330. Each arm actuator 336 is attached to an arm 338 or a plurality of arms 338. The arms 338 are slidably mounted on beams 350. A pivot 340 attaches a strut 342 to each arm 338. A hydraulic ram 344 extends between each arm 338 and each strut 342 and urges the struts 342 to be raised and lowered. A series of hold back metering fingers 346 and a series of discharge metering fingers 348 are mounted to the struts 342.

Figure 7:
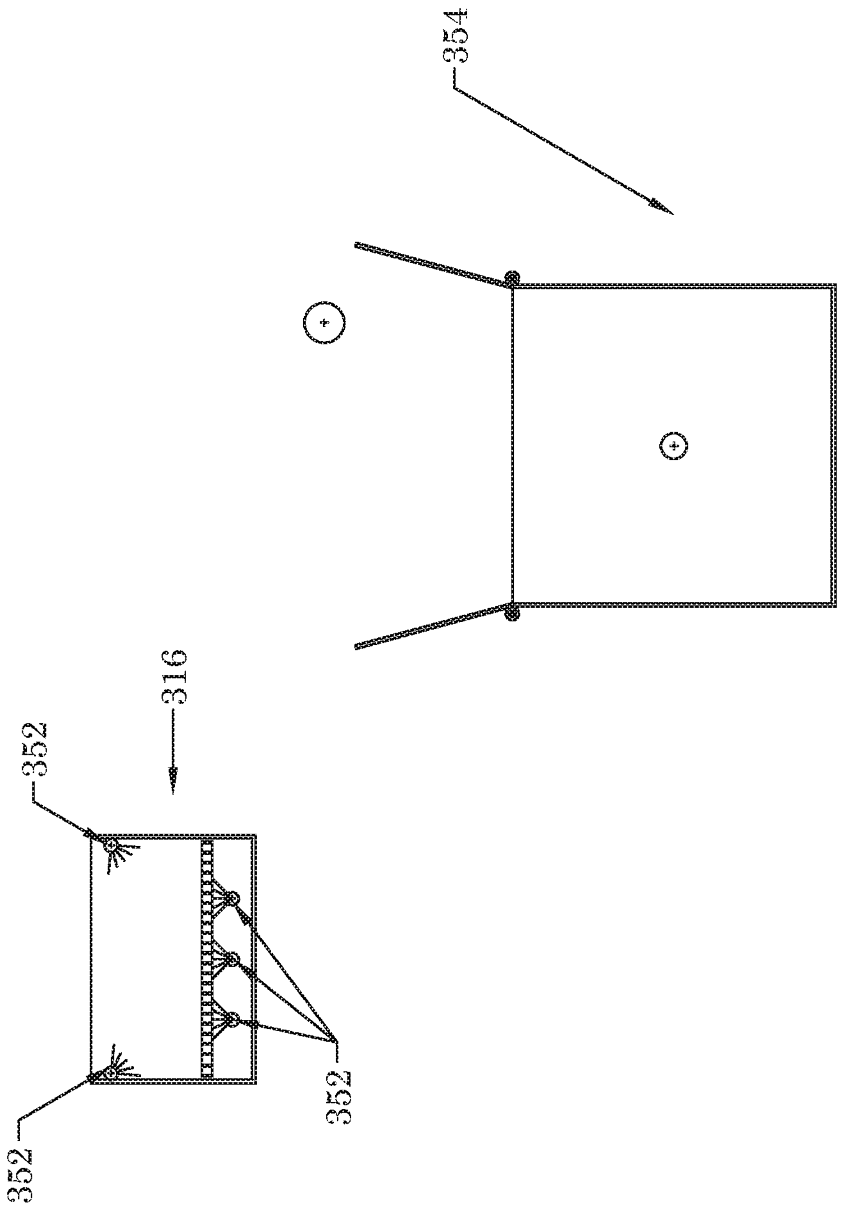
FIG. 7 is a side view of the waxing chamber.

As shown in FIG. 7, the waxing chamber 316 includes spray bars 352 that are in communication with a slack wax reservoir 354.

Method

Strand Production

The logs were sent through a debarking and moisture sensing line for feedstock sorting, using existing technologies. Logs below the lower moisture threshold of conventional processing methods were sent to the engineered wood manufacturing system 10. The logs were yard sorted based on length, diameter, species and general condition. Therefore, feed rates were generally consistent as the batches were processed.

The mechanical fiber processor 12 receives the logs or wood from the logs, which are then subjected to compressive forces and tensile forces as the logs travel through the mechanical fiber processor 10. The knurled hydraulic powered upper rollers 30 exert compressive force and propels the logs through the mechanical fiber processor 12, while the circumferentially grooved hydraulic powered lower roller 32 exert the compressive and tensile forces. The combination of tensile and compressive forces maintained a natural strand orientation, other words, the strands remained in essentially the same orientation as they were in the tree and were substantially parallel about a longitudinal axis. The compressive forces may be consistent in a bank of rollers, or may be varied, for example, a higher force at the entry end of the mechanical fiber processor, with the compressive force gradually decreasing towards the exit end of the mechanical fiber processor. Alternatively, the compressive force may be lower at the entry end of the mechanical fiber processor and increase towards the exit end of the mechanical fiber processor. The tensile forces may be consistent in a bank of rollers, or may be varied, for example, a higher force at the entry end of the mechanical fiber processor, with the compressive force gradually decreasing towards the exit end of the mechanical fiber processor. Alternatively, the tensile force may be lower at the entry end of the mechanical fiber processor and increase towards the exit end of the mechanical fiber processor. In order to optimize the method for a specific wood (species, moisture content, integrity (for example, degree of rot)), feed rate, in addition to pressure is adjustable. The strands, which remain in a natural strand orientation and have the same fiber length as in the tree, pass out of the exit end of the mechanical fiber processor and are ready for entry into the two-axis press.

During the stranding operation, any wood materials that are not forming strands are released and drop from the active stranding zone through the chutes that are between processing units. This includes rot, knots and other non-strand wood and wood particles. The non-strand wood drops onto the waste conveyor, which is located below the active stranding zone and the chutes and is carried from the mechanical fiber processor for use in heat or electricity generation.

For the production of one batch of strands from pine beetle killed Lodgepole pine, the successful feed rate was about 16 feet/per min, the oscillation frequency was about 1 stroke per 4 seconds and the amplitude was about 2 inches, for a total travel of about 4 inches.

FIG. 8A-E shows a schematic of the log or wood from the log undergoing processing to provide naturally oriented strands. FIG. 8A is a front view of the log in a processing unit before it is processed. The log is proximate the entry end of the mechanical fiber processor. FIG. 8B is a sectional view of the log in a processing unit in the early stages of processing. The log has been propelled to a processing unit downstream of the entry end. The diameter of the log can be seen to be reduced and it can be seen that it is flattening laterally. This lateral flattening is caused by both the vertical, compressive force and the lateral tensile force. FIG. 8C is a sectional view of the log in a processing unit further downstream. The diameter of the log can be seen to be further reduced. FIG. 8D is a sectional view of the log as it begins to be stranded. It is in a processing unit still further downstream. The oscillations of the lateral tensile force further separate the strands, while retaining them in a natural orientation. FIG. 8E is an end view of the strands in a processing unit proximate the exit end of the mechanical fiber processor.

FIG. 9 is a top view of the log undergoing processing to provide naturally oriented strands of fibers. It can be seen that the log is gradually flattened and the strands are then released. The oscillations of the laterally actuated rams lead to oscillations in the strands, urging them apart while retaining them in alignment. FIG. 10 is a side view of the log undergoing processing to provide naturally oriented strands of fibers. Debris can be seen falling onto the waste conveyor as the strands are released and non-stranded wood falls through the chutes.

Engineered Wood Production

In one embodiment, the method does not involve a strand orientation step after stranding and before pressing as the strands of fibers have maintained their natural orientation.

Once the strands of fibers were harvested from the mechanical fiber processor the fibers were pushed into the wax application chamber where they were sprayed with a slack wax. A pressure and temperature activated dry chemical bonding agent (existing in Oriented Strand Board [OSB] production) was then added to a bundle of the fibers through a known dry chemical feed system. The adhesive covered fibers were fed into the two-axis press 18, through the aperture 224. Note that "covered" in the current context means that the surfaces of the strands of wood fiber are substantially covered. The top dynamic wall 210 is static while the lateral press plate 222 is actuated to urge the bundle of fibers into the pressing chamber 202 and is aligned with the vertical wall 204 and is positioned with an appropriate clearance to allow for inward travel of the top dynamic wall 210 to provide the selected dimension specification in terms of width and depth. The top dynamic wall 210 then remains static. The lateral press plate 222, which is normal to the top dynamic wall 210 and the bottom static wall 212, applied a normal force to achieve desired density and length.

In another embodiment, the method involves a metering step. Once the strands of fibers were harvested from the mechanical fiber processor, they were dried in a dehydrator and then metered as shown in FIGS. 11A to C. FIG. 11A shows the strands of fibers loaded into the metering unit 310. The push gate 321 is in a fully retracted position allowing the chamber 326 to accept fiber. The hold back fingers 346 and discharge fingers 348 remain disengaged. Fiber is fed into the chamber 326 from the outfeed end of the processing unit 50.

FIG. 11B shows the strands of fibers being aligned and compacted into a bundle. The push gate 321 travels linear through the chamber 326 until the fiber bundle reaches a desired density. The fibers are aligned and compacted against the closed discharge gate 334. The push gate hydraulic ram 322 pressure determine the density.

Metering is achieved by the positions of the hold back fingers 346 and discharge fingers 348. The hold-back and discharge mechanisms are located above the slotted top 332, opposing each other. Both sets of fingers 346, 348 intersect and are arranged to penetrate the fiber on the same plane, parallel with the push gate 321. Once engaged, they simultaneously pass through the slotted top 332 and penetrate the fiber.

FIG. 11C shows the fibers being pushed into the waxing chamber 316 where they are sprayed with a slack wax. The hold back fingers 346 remain static in the fully engaged position. The discharge gate 334 opens, providing a flow path for the fiber. The discharge fingers 348 then pull the desired quantity of aligned and metered fiber into the downstream unit. The push gate 321 returns to the start position and the hold back fingers 346 and discharge fingers 348 retract through the slotted top 332 into the start position. Residual fiber remains in place below the hold back fingers 348 for the next cycle. Note: There may be enough fiber to repeat the metering and completion steps before reloading the chamber with fiber. Infeed quantity and desired end-product dimension will determine the cycle efficiency.

A pressure and temperature activated dry chemical bonding agent (existing in Oriented Strand Board [OSB] production) was then added to a bundle of the fibers through a known dry chemical feed system. The adhesive covered fibers were fed into the two-axis press 18, through the aperture 224. Note that "covered" in the current context means that the surfaces of the strands of wood fiber are substantially covered. The top dynamic wall 210 is static while the lateral press plate 222 is actuated to urge the bundle of fibers into the pressing chamber 202 and is aligned with the vertical wall 204 and is positioned with an appropriate clearance to allow for inward travel of the top dynamic wall 210 to provide the selected dimension specification in terms of width and depth. The top dynamic wall 210 then remains static. The lateral press plate 222, which is normal to the top dynamic wall 210 and the bottom static wall 212, applied a normal force to achieve desired density and length.

FIG. 12A is an end view of the strands in the two-axis press before the rams are actuated. FIG. 12B is an end view of the strands in the two-axis press after the vertical ram has been actuated. FIG. 12C is an end view of the strands in the two-axis press after the horizontal ram has been actuated.

The dual forces of the two-axis press allow for varying densities and dimensions of engineered wood to be produced. When specific densities are desired, the density of the source wood is determined by cutting a block into a selected dimension and measuring its mass. The density of a batch of logs is quite consistent, therefore, this measurement can be used for the whole batch.

A computer with a processor and a memory, which is configured to instruct the processor, is in electronic communication with the digital controller. The computer calculates the amount of feedstock and the pressure required to provide a selected density of engineered wood based on the density of the source wood. The digital controller then controls the pressure exerted by the horizontal press plate 222.

The engineered wood can be formed into structural beams and columns, architectural and decorative columns, I beams, joists, floor beams, posts, framing lumber, railroad ties, power poles, building panels, bridge beams and decking, fencing, residential decking, flooring and custom designs. All the wood products are natural orientation strand engineered wood products.

The densities that can be obtained using the two-axis press are shown in Table 1.

TABLE 1

Densities of a range of woods.

| Species | Density ((kg/m$^3$) | Density (lb/ft$^3$) |
|---|---|---|
| Alder | 400-700 | 26-42 |
| Afrormosia | 710 | |
| Agba | 510 | |
| Apple | 650-850 | 41-52 |
| Ash, white | 650-850 | 40-53 |
| Ash, black | 540 | 33 |
| Ash, European | 710 | |
| Aspen | 420 | 26 |
| Balsa | 160 | 7-9 |
| Bamboo | 300-400 | 19-25 |
| Basswood | 300-600 | 20-37 |
| Beech | 700-900 | 32-56 |
| Birch, British | 670 | 42 |
| Birch, European | 670 | |
| Box | 950-1200 | 59-72 |
| Butternut | 380 | 24 |
| Cedar of Lebanon | 580 | |
| Cedar, western red | 380 | 23 |
| Cherry, European | 630 | 43-56 |
| Chestnut, sweet | 560 | 30 |
| Cottonwood | 410 | 25 |
| Cypress | 510 | 32 |
| Dogwood | 750 | 47 |
| Douglas Fir | 530 | 33 |
| Ebony | 1100-1300 | 69-83 |
| Elm, American | 570 | 35 |
| Elm, English | 550-600 | 34-37 |
| Elm, Dutch | 560 | |
| Elm, Wych | 690 | |
| Elm, Rock | 820 | 50 |
| Gaboon | 430 | |
| Greenheart | 1040 | |
| Gum, Black | 590 | 36 |
| Gum, Blue | 820 | 50 |
| Gum, Red | 540 | 35 |
| Hackberry | 620 | 38 |
| Hemlock, western | 500 | |
| Hickory | 830 | 37-58 |
| Holly | 750 | 47 |
| Iroko | 660 | |
| Juniper | 550 | 35 |
| Keruing | 740 | |
| Larch | 500-550 | 31-35 |
| Lignum Vitae | 1170-1330 | 73-83 |
| Lime, European | 560 | |
| Locust | 650-700 | 42-44 |
| Logwood | 900 | 57 |
| Madrone | 740 | 45 |
| Magnolia | 570 | 35 |
| Mahogany, African | 500-850 | 31-53 |
| Mahogany, Cuban | 660 | 40 |
| Mahogany, Honduras | 650 | 41 |
| Mahogany, Spanish | 850 | 53 |
| Maple | 600-750 | 39-47 |
| Meranti, dark red | 710 | |
| Myrtle | 660 | 40 |
| Oak | 600-900 | 37-56 |
| Oak, American Red | 740 | 45 |
| Oak, American White | 770 | 47 |
| Oak, English Brown | 740 | 45 |
| Obeche | 390 | |
| Oregon Pine | 530 | 33 |
| Parana Pine | 560 | 35 |

TABLE 1-continued

Densities of a range of woods.

| Species | Density ((kg/m$^3$) | Density (lb/ft$^3$) |
|---|---|---|
| Pear | 600-700 | 38-45 |
| Pecan | 770 | 47 |
| Persimmon | 900 | 55 |
| Philippine Red Luan | 590 | 36 |
| Pine, pitch | 670 | 52-53 |
| Pine, Corsican | 510 | |
| Pine, radiata | 480 | |
| Pine, Scots | 510 | |
| Pine, white | 350-500 | 22-31 |
| Pine, yellow | 420 | 23-37 |
| Plane, European | 640 | |
| Plum | 650-800 | 41-49 |
| Poplar | 350-500 | 22-31 |
| Ramin | 670 | |
| Redwood, American | 450 | 28 |
| Redwood, European | 510 | 32 |
| Rosewood, Bolivian | 820 | 50 |
| Rosewood, East Indian | 900 | 55 |
| Sapele | 640 | |
| Satinwood | 950 | 59 |
| Spruce | 400-700 | 25-44 |
| Spruce, Canadian | 450 | 28 |
| Spruce, Norway | 430 | |
| Spruce, Sitka | 450 | 28 |
| Spruce, western white | 450 | |
| Sycamore | 400-600 | 24-37 |
| Tanguile | 640 | 39 |
| Teak, Indian | 650-900 | 41-55 |
| Teak, African | 980 | 61 |
| Teak, Burma | 740 | 45 |
| Utile | 660 | |
| Walnut | 650-700 | 40-43 |
| Walnut, Amer Black | 630 | 38 |
| Walnut, Claro | 490 | 30 |
| Walnut, European | 570 | 35 |
| Water gum | 1000 | 62 |
| Whitewood, European | 470 | |
| Willow | 400-600 | 24-37 |
| Yew | 670 | |
| Zebrawood | 790 | |

The natural orientation strand engineered wood products have the same range of hardness as a range of wood species. The range of hardness that can be obtained using the two-axis press is shown in Table 2. Note that the hardness is obtained in the absence of hardening agents.

TABLE 2

Hardness of a range of woods.

| Janka (pounds force) | Species |
|---|---|
| 350 | Buckeye Burl |
| 380 | Aspen |
| 410 | Basswood |
| 470 | Guanacaste (Parota) |
| 490 | Butternut |
| 540 | American Chestnut |
| 540 | Poplar |
| 540 | Mappa Burl |
| 600 | Spanish Cedar |
| 800 | Genuine Mahogany |
| 850 | Quilted Western Maple |
| 850 | Western Maple Burl |
| 850 | Curly Western Maple |
| 850 | Black Ash |
| 891 | Lacewood |
| 930 | Anigre |
| 950 | Cherry |
| 950 | Curly Maple (Red Leaf) |
| 950 | Cherry Burl |

TABLE 2-continued

Hardness of a range of woods.

| Janka (pounds force) | Species |
|---|---|
| 950 | Maple (Red Leaf) |
| 950 | Curly Cherry |
| 950 | Tornillo |
| 960 | Peruvian Walnut |
| 1010 | Walnut |
| 1010 | Figured Walnut |
| 1020 | Holly |
| 1055 | Curly Pyinma |
| 1100 | African Mahogany |
| 1100 | Figured Mango |
| 1160 | Thuya Burl |
| 1170 | Koa |
| 1200 | Redhead |
| 1200 | Masur Birch |
| 1210 | Nicaraguan Rosewood |
| 1220 | Red Oak |
| 1220 | Curly Oak |
| 1220 | Quarter Sawn Red Oak |
| 1220 | Spalted Oak |
| 1260 | Birch |
| 1260 | Flame Birch |
| 1260 | Birch Burl |
| 1260 | Amboyna Burl |
| 1260 | Curly Narra |
| 1260 | Narra |
| 1294 | Figured Makore |
| 1294 | Makore |
| 1320 | White Ash |
| 1320 | Curly White Ash |
| 1320 | Swamp Ash |
| 1330 | Shedua |
| 1335 | Quarter Sawn White Oak |
| 1335 | White Oak |
| 1350 | Ebiara |
| 1360 | English Brown Oak |
| 1400 | Mayan Walnut |
| 1400 | Eucalyptus |
| 1439 | Quilted Sapele |
| 1450 | Birdseye Maple |
| 1450 | Hard Maple |
| 1450 | Curly Maple (Hard Maple) |
| 1450 | Quarter Sawn Maple |
| 1450 | Bark Pocket Maple |
| 1450 | Hard Maple Burl |
| 1450 | Spalted Maple |
| 1450 | Rift Sawn Hard Maple |
| 1460 | Madrone Burl |
| 1500 | Sapele |
| 1520 | Canarywood |
| 1548 | Honey Locust |
| 1560 | Afrormosia |
| 1712 | Merbau |
| 1780 | Black & White Ebony |
| 1800 | Camphor Bush Burl |
| 1800 | Figured Camphor Bush |
| 1810 | Afzelia Burl |
| 1820 | Hickory |
| 1830 | Zebrawood |
| 1830 | Figured Zebrawood |
| 1860 | Jarrah Burl |
| 1878 | Yellowheart |
| 1900 | Red Palm |
| 1930 | Wenge |
| 1960 | Bolivian Rosewood |
| 1970 | Padauk |
| 1970 | Ziricote |
| 2010 | Bocote |
| 2020 | Black Palm |
| 2140 | Sucupira |
| 2150 | Leopardwood |
| 2160 | Goncalo Alves |
| 2200 | Chechen |
| 2200 | Honduras Rosewood |
| 2200 | Honduras Rosewood Burl |
| 2250 | Chakte Viga |
| 2318 | Spalted Tamarind |
| 2400 | Osage Orange (Argentine) |
| 2400 | Santos Mahogany |
| 2410 | Figured Bubinga |
| 2410 | Quilted Bubinga |
| 2410 | Bubinga |
| 2430 | Cochen Rosewood |
| 2430 | Indian Ebony |
| 2440 | E. Indian Rosewood |
| 2480 | Tamboti |
| 2490 | Red Mallee Burl |
| 2490 | Brown Mallee Burl |
| 2500 | Tulipwood |
| 2520 | Purpleheart |
| 2520 | Figured Purpleheart |
| 2532 | Marblewood |
| 2620 | Amazon Rosewood |
| 2690 | Jatoba |
| 2690 | Olivewood |
| 2700 | Granadillo |
| 2760 | Osage Orange (USA) |
| 2900 | Bloodwood |
| 2920 | Yellow Box Burl |
| 2960 | Cocobolo |
| 3000 | Mun Ebony |
| 3080 | Gaboon Ebony |
| 3080 | Royal Ebony |
| 3160 | Angelim Pedra |
| 3220 | Macassar Ebony |
| 3230 | Pink Ivory |
| 3330 | Cumaru |
| 3340 | Kingwood |
| 3340 | Camatillo |
| 3370 | Grey Box Burl |
| 3390 | Mopani |
| 3590 | Brown Ebony |
| 3660 | Katalox |
| 3660 | Figured Katalox |
| 3670 | African Blackwood |
| 3690 | Brazilian Ebony |
| 3710 | Lignum Vitae (Argentine) |
| 3730 | Red Coolibah Burl |
| 3800 | Snakewood |
| 4380 | Lignum Vitae (Genuine) |

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein.

The invention claimed is:

1. A mechanical fiber processor for producing naturally oriented strands of fibers from timber, the mechanical fiber processor including: a framework, which has a top, a base which opposes the top, and a pair of vertical member therebetween; a plurality of processing units, each processing unit comprising a frame which includes a first slider and a second slider each which slides vertically on a vertical member of the pair of vertical members, a vertically disposed ram which is attached to the framework and the frame and extends therebetween, a surface contoured first roller which is rotatably mounted on the first slider, a first motor which is mounted on the second slider and is in motive relation with the surface contoured first roller, a horizontal slider, which is slidably mounted on the pair of vertical members, a horizontally disposed ram which is attached to the framework and the horizontal slider, a surface contoured second roller which is rotatably mounted on the horizontal slider, and a second motor which is mounted on the horizontal slider and is in motive relation with the surface contoured first roller and a chute between each processing unit.

2. The mechanical fiber processor of claim 1, further comprising a waste conveyor below the chutes and processing units.

3. The mechanical fiber processor of claim 2, wherein the surface contoured first roller is knurled.

4. The mechanical fiber processor of claim 3, wherein the surface contoured second roller is circumferentially grooved.

5. The mechanical fiber processor of claim 4 further comprising a digital controller which is in electronic communication with the processing units.

6. The mechanical fiber processor of claim 5, wherein the digital controller is configured to control the horizontally disposed rams such that the horizontally disposed rams in adjacent processing units oscillate in an opposing direction.

7. The mechanical fiber processor of claim 6, wherein the digital controller is configured to control rotating and oscillating of the surface contoured second roller such that the surface contoured second roller is rotating while oscillating.

8. The mechanical fiber processor of claim 7, wherein the surface contoured first roller and the surface contoured second roller are directly driven by the first motor and the second motor, respectively.

9. The mechanical fiber processor of claim 8, wherein the horizontally disposed ram has a horizontal travel of at least about 2 inches.

10. A method of processing timber to produce strands of fibers, the method comprising selecting the mechanical fiber processor of claim 1, exerting a motive force on the timber with the surface contoured first roller, exerting a compressive force with the surface contoured first roller and the surface contoured second roller which are pressed towards one another and simultaneously exerting a lateral oscillating tensile force on the timber with the surface contoured second roller, thereby processing timber to produce strands of fibers.

11. The method of claim 10, further comprising a non-stranded timber falling through the chute between each processing unit.

12. The method of claim 11 further comprising collecting and transporting the non-stranded timber on a waste conveyor.

13. A method of processing wood to produce strands of fibers having a parallel orientation, the method comprising feeding the wood through a processor with a plurality of knurled motive rollers and a plurality of circumferentially grooved separating rollers, while exposing the wood to compressive and tensile forces, and a non-stranded wood falling through a chute which is between the plurality of circumferentially grooved separating rollers, thereby processing wood to produce strands of fibers having a parallel orientation.

14. The method of claim 13, wherein the plurality of knurled rollers and the plurality of circumferentially grooved rollers exert the compressive forces on the wood.

15. The method of claim 14, wherein the plurality of circumferentially grooved rollers exert the tensile forces on the wood.

16. The method of claim 15 wherein the plurality of circumferentially grooved rollers oscillate laterally to exert the tensile forces on the wood.

17. The method of claim 16, wherein an adjacent pair of rams oscillate with an amplitude which is reverse to one another.

* * * * *